Dec. 14, 1954        P. ANGÉNIEUX        2,696,758
WIDE-ANGLE PHOTOGRAPHIC OBJECTIVE
Filed March 23, 1953
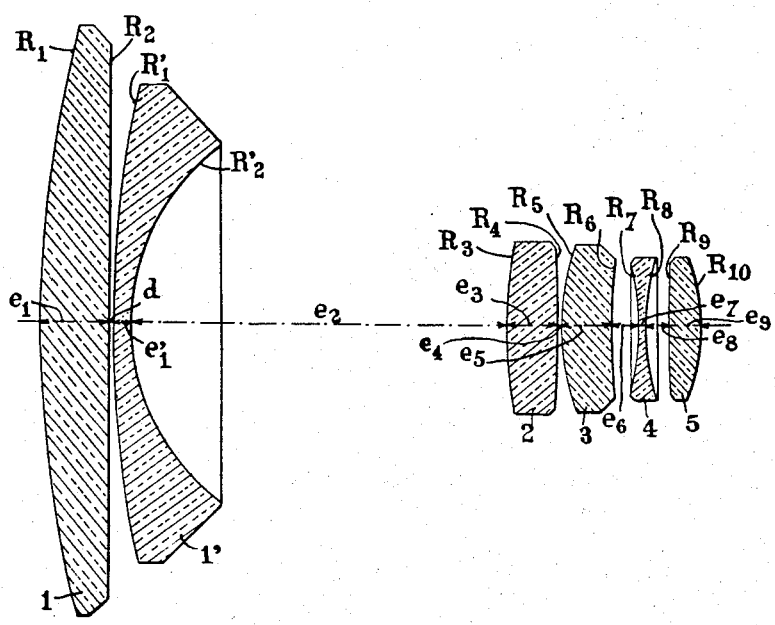
INVENTOR:
PIERRE ANGENIEUX

United States Patent Office 2,696,758
Patented Dec. 14, 1954

2,696,758

WIDE-ANGLE PHOTOGRAPHIC OBJECTIVE

Pierre Angénieux, Paris, France

Application March 23, 1953, Serial No. 343,980

Claims priority, application France May 29, 1952

5 Claims. (Cl. 88—57)

This invention relates to wide-angle objectives and more specifically to a wide-angle objective of the type disclosed in the U. S. patent application Ser. No. 176,573 filed on July 29, 1950, now U. S. Patent 2,649,022, dated August 18, 1953, by same applicant.

The objective described in the aforesaid application consisted broadly of a meniscus-shaped divergent lens of forwardly-directed convexity, and of a group of lenses constituting a convergent unit positioned well at the rear relative to the negative lens. That objective is remarkable notably in that the distance from the rear face of the rearmost lens to the focal plane of the objective, which is also called back focal length is substantially greater than its focal length. Practically, the back focal length obtainable with this objective is of the same order as, or slightly greater than, the focal length of the objective, while yielding a high-quality image in a very wide field angle.

Now the essential object of this invention is to increase to a substantial extent the relative value of this back focal length. Obviously, the greater the optical power of the divergent frontal lens, the greater the back focal length relative to the focal length of the assembly. However, if it is attempted to increase the optical power of this divergent lens it will become apparent that there is a limiting value that cannot be overstepped if it is desired to avoid an exaggerated or undue distortion of the image given by the objective.

According to this invention, the aforesaid limit can be moved back to a considerable extent and the ratio: back focal length/focal length of the objective assembly substantially increased while maintaining the image distortion factor within permissible limits, by replacing the single frontal divergent lens by a divergent system comprising a pair of air-separated lenses of which the one is convergent and the other divergent.

Thus, an objective, constructed according to this invention and such as its back focal length ranges from 115% to 160% of the focal length of the objective assembly, comprises two groups of lenses, namely: at the front, one group of lenses constituting a dispersive part comprising a convergent lens and a divergent lens, and at the rear of this group, another group of lenses constituting a collective part comprising four lenses as follows in the front-to-rear direction: a convergent lens, a convergent meniscus lens having its two convex surfaces to the front, a biconcave lens and a convergent lens.

The dispersive part positioned at the front has the following structure: at the front, it comprises a convergent lens the rear face of which may be either concave or convex, and at the rear a divergent meniscus lens of forwardly-directed convexity.

Calculations and practical tests made by the applicant have proved that the thus constituted dispersive part had to meet the following requirements: the axial distance from this system to the collective part must be greater than 50% of the focal length of the objective assembly but lower than twelve times this focal length. However, in many applications it will be desirable to reduce the upper limit of this axial length to three times the focal length of the objective assembly, in order to keep overall dimensions within reasonable limits.

In addition, the front convergent lens should have a focal length numerically greater than the focal length of the dispersive part and lower than ten times this focal length. Besides, the focal length of the rear divergent meniscus lens must be numerically greater than 45% of the focal length of the said dispersive part and smaller than 90% of this focal length.

In carrying out this dispersive part, it is also desirable to comply with the following requirements: the convergent lens should have a convex front surface the radius of curvature of which is greater than the focal length of the said dispersive part and lower than ten times this focal length. According to a preferred form of embodiment of the invention this higher limit is reduced to four times this focal length.

The divergent meniscus lens provided at the rear of the dispersive part has a convex front surface the radius of curvature of which is greater than the focal length of the said dispersive part and smaller than four times this focal length, whereas the rear surface of the same meniscus lens is concave and has a radius of curvature greater than 25% of the focal length of the dispersive part and smaller than 60% of this focal length.

The two lenses constituting the dispersive part must be very closely spaced from each other. Thus, the axial distance therebetween must never exceed 10% of the focal length of the said dispersive part.

Regarding the refraction indices of the lenses constituting the dispersive part, high indices will preferably be used so as to obtain the lowest possible curvatures (indices higher than 1.58).

Also preferably the dispersing power of the glass constituting these lenses must be so selected that the value of $\nu$ will be lower than 45 for the convergent lens and higher than 45 for the divergent lens.

The table hereunder and the accompanying drawing refer to one form of embodiment of the wide-angle objective according to this invention. The values of the radiuses of curvature, lens thicknesses and lengths are given for an objective having a focal length of 100 units and a back focal length of 135.08. In this example, the focal length of the dispersive part constituted by lenses 1 and 1' is about 182. The focal length of lens 1 is about 570, while that of lens 1' is about 133.

[F=100. Back focal length=135.08]

| Radiuses | Thicknesses and Lengths | Glass Quality | |
|---|---|---|---|
| | | $n_d$ | $\nu$ |
| $R_1 = +341.16$ | $e_1 = 20.96$ | 1.6751 | 32.3 |
| $R_2 = +2877.39$ | $d = 1.06$ | air | |
| $R'_1 = +350.66$ | $e'_1 = 5.24$ | 1.6204 | 60.2 |
| $R'_2 = +66.65$ | $e_2 = 111.46$ | air | |
| $R_3 = +135.69$ | $e_3 = 15.72$ | 1.6204 | 60.2 |
| $R_4 = -323.65$ | $e_4 = 0.53$ | air | |
| $R_5 = +72.70$ | $e_5 = 15.33$ | 1.6204 | 60.2 |
| $R_6 = +197.31$ | $e_6 = 9.78$ | air | |
| $R_7 = -83.71$ | $e_7 = 2.22$ | 1.6287 | 35.3 |
| $R_8 = +64.93$ | $e_8 = 7.03$ | air | |
| $R_9 = +323.65$ | $e_9 = 8.90$ | 1.6204 | 60.2 |
| $R_{10} = -54.08$ | | | |

In the accompanying drawing the pair of lenses constituting the front dispersive part are designated by the reference signs 1 and 1', whilst the lenses of the rear collective part are shown at 2, 3, 4 and 5. The various radiuses or curvature and thicknesses, as well as the lengths and spacings given in the above table are clearly indicated in the drawing.

Of course, the form of embodiment defined in the table hereinabove and the accompanying drawing is given by way of example only.

What I claim as new is:

1. A wide-angle objective consisting of two parts, one collective and the other dispersive; the collective part comprising four lenses, namely (counting from the front): a convergent lens, a convergent meniscus lens with both surfaces convex towards the front, a biconcave lens, a convergent lens; the air gap between this collective part and the focal plane of the objective assembly (back focal length) ranging from 115% to 160% of the focal length of said objective assembly; the dispersive part comprising two lenses, a convergent lens and a divergent meniscus lens with both surfaces convex towards the front, said dispersive part being positioned in front of the collective part at an axial distance therefrom greater than half the focal length of the objective assembly and smaller than 12 times said focal length and having a focal length numerically smaller than 4 times the focal length of the objective assembly and greater than said focal length; the convergent lens of the said dispersive part having a focal length numerically smaller than 10 times the focal length of the dispersive part and greater than said focal length, whilst the focal length of the divergent meniscus lens is numerically smaller than 90% of the focal length of the dispersive part and greater than 45% of said focal length.

2. A wide-angle objective as claimed in claim 1 in which the convergent lens of the dispersive part has a front convex surface, the radius of curvature of which is greater than the focal length of the said dispersive part and smaller than ten times said focal length.

3. A wide-angle objective as claimed in claim 1 in which the divergent meniscus lens of the dispersive part has a front convex surface, the radius of curvature of which is greater than the focal length of the said part and smaller than four times the said focal length, whilst its rear concave surface has a radius of curvature greater than 25 per cent of the focal length of the said part and smaller than 60 per cent of the said focal length.

4. A wide-angle objective as claimed in claim 1 in which the two lenses constituting the dispersive part are separated from each other by an axial distance smaller than 10 per cent of the focal length of said dispersive part.

5. A wide-angle objective having the following numerical data:

[F = 100.    Back focal length = 135.08]

| Radiuses | Thicknesses and Lengths | Glass Quality | |
|---|---|---|---|
| | | $n_d$ | $\nu$ |
| $R_1 = +341.16$ | $e_1 = 20.96$ | 1.6751 | 32.3 |
| $R_2 = +2877.39$ | $d = 1.06$ | air | |
| $R'_1 = +350.66$ | $e'_1 = 5.24$ | 1.6204 | 60.2 |
| $R'_2 = +66.65$ | $e_2 = 111.46$ | air | |
| $R_3 = +135.69$ | $e_3 = 15.72$ | 1.6204 | 60.2 |
| $R_4 = -323.65$ | $e_4 = 0.53$ | air | |
| $R_5 = +72.70$ | $e_5 = 15.33$ | 1.6204 | 60.2 |
| $R_6 = +197.31$ | $e_6 = 9.78$ | air | |
| $R_7 = -83.71$ | $e_7 = 2.22$ | 1.6287 | 35.3 |
| $R_8 = +64.93$ | $e_8 = 7.03$ | air | |
| $R_9 = +323.65$ | $e_9 = 8.90$ | 1.6204 | 60.2 |
| $R_{10} = -54.08$ | | | | in which: ($R_1$ to $R_{10}$) = the radii of curvature of the several optical lens surfaces, ($e_1$ to $e_9$) = the axial thicknesses between the refracting lens surfaces, ($d$) = the axial separation between the convergent and divergent lens elements of the dispersive part of the objective, ($n_d$) = index of refraction for the $d$ line of the lens materials, and ($\mu$) = the dispersive power of Abbe number of said lens materials, and (F) = the focal length of the objective assembly.

References Cited in the file of this patent

UNITED STATES PATENTS

| Number | Name | Date |
|---|---|---|
| 1,863,099 | Bowen | June 14, 1932 |
| 1,955,590 | Lee | Apr. 17, 1934 |
| 2,548,569 | Tolle | Apr. 10, 1951 |
| 2,594,020 | Hopkins et al. | Apr. 22, 1952 |
| 2,649,022 | Angenieux | Aug. 18, 1953 |

FOREIGN PATENTS

| Number | Country | Date |
|---|---|---|
| 388,215 | Great Britain | Feb. 23, 1933 |